United States Patent [19]

Spector

[11] Patent Number: 5,380,539
[45] Date of Patent: Jan. 10, 1995

[54] CONVERTIBLE JELLY CANDY CUP AND STICK ASSEMBLY

[76] Inventor: Donald Spector, 380 Mountain Rd., Union City, N.J. 07080

[21] Appl. No.: 134,688

[22] Filed: Oct. 12, 1993

[51] Int. Cl.$^6$ ............................................. A23G 3/00
[52] U.S. Cl. ..................... 426/115; 426/112; 426/106; 426/576; 426/660
[58] Field of Search ............... 426/115, 112, 106, 576, 426/660

[56] References Cited

U.S. PATENT DOCUMENTS

| | | | |
|---|---|---|---|
| 2,175,735 | 10/1939 | Banks | 426/115 X |
| 2,949,710 | 8/1960 | Wheeler | 426/115 |
| 3,424,351 | 1/1969 | Cilluffo et al. | 426/115 X |

*Primary Examiner*—Joseph Golian
*Attorney, Agent, or Firm*—Michael Ebert

[57] ABSTRACT

An edible jelly that is convertible by means of a chopstick or other implement capable of kneading the jelly into a taffy or slime-like candy. The jelly stock, formed by a flowable composition whose ingredients include gelatin, is poured into an open cup where it proceeds to undergo setting in the course of which gelling takes place. But before the composition is permitted to fully set and while it is still in a partially-gelled, sticky state, the cup is sealed by a removable cover to arrest further setting. When a child wishes to convert the partially-set jelly into a taffy or slime-like candy, the child removes the cover from the cup and then kneads the jelly therein with the implement to disrupt its internal structure until the jelly assumes the desired constituency, at which point the child with his fingers can pull the converted jelly out of the cup, stretch it into strands and eat the strands as candy.

7 Claims, 1 Drawing Sheet

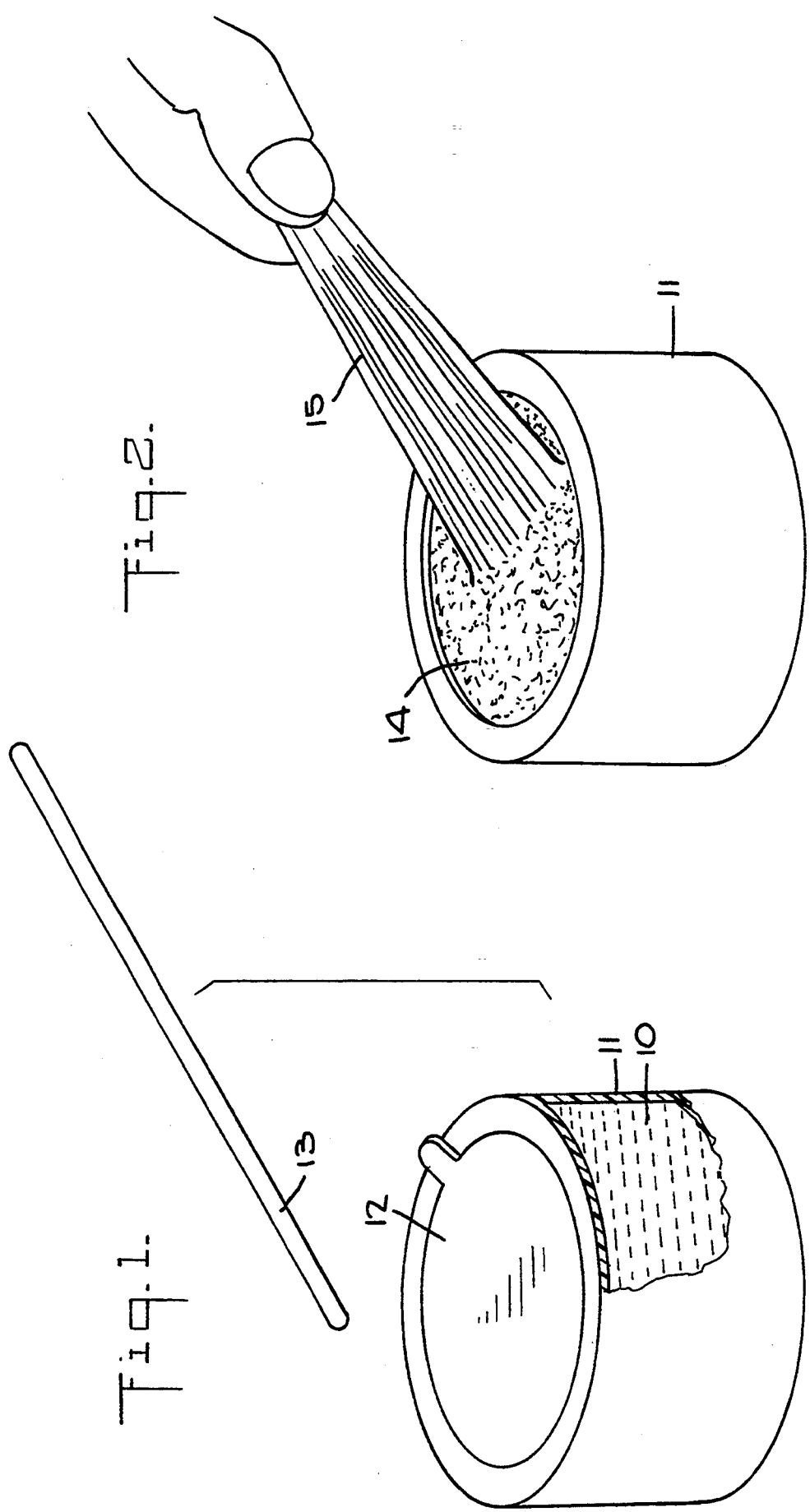

CONVERTIBLE JELLY CANDY CUP AND STICK ASSEMBLY

BACKGROUND OF INVENTION

1. Field of Invention

This invention relates generally to candy compositions, and in particular to a cup containing a partially-set jelly that is convertible by a chop stick or similar implement into a slime or taffy-like candy.

2. Status of Prior Art

A gel is a colloid in which the disperse phase has combined with the liquid medium used to disperse it to produce a semi-solid material such as a jelly. An edible jelly is a soft, semi-solid food substance with a resilient constituency made by setting a liquid containing pectin or gelatin. A pectin is a water-soluble colloidal carbohydrate of high molecular weight found in ripe fruits, such as apples and plums. A gelatin is a protein obtained from collagen by boiling specially prepared skins, bones and connective tissues of animals.

Many candies are made from an edible jelly that is molded to assume a bean-like shape or an animal-like form, such as that of a miniature bear. But regardless of the form the candy takes, its surface is not sticky, for the jelly is fully set.

But while most children are trained to avoid soiling their hands and face and their clothing in the process of eating, the inescapable fact is that implanted in each child is a primordial urge which if given free reign, would cause him to behave in a primitive fashion. This is evident in very young children at a stage in their early development where they cannot be taught how to eat properly. At this early stage, the child when presented with a bowl of oatmeal or other viscous form of food having a gooey constituency, if left to his own devices, will use his fingers not only as an eating implement, but also to smear the food and make the greatest possible mess. This child draws no distinction between play and eating and often combines both functions, if permitted to do so.

The present invention provides older children with a jelly candy in a cup, to which jelly the child is able to impart taffy or slime-like characteristics, so that the candy can be consumed in a primitive fashion.

SUMMARY OF THE INVENTION

In view of the foregoing, the main object of this invention is to provide an edible jelly in a cup that is convertible by a chop stick or similar implement capable of kneading the jelly into a taffy or slime-like candy.

More particularly an object of this invention is to provide in a cup a partially-set jelly whose internal structure is ruptured when the jelly is kneaded whereby the jelly then assume the consistency of a taffy or slime that can be pulled out of the cup by the fingers and stretched to form edible candy strands.

A significant feature of a cup and stick assembly in accordance with the invention is that it makes the process of producing the taffy-like candy and eating it, a messy operation and thereby permit a child to indulge his primitive instincts and to combine eating with play.

Briefly stated, these objects are realized in an edible jelly that is convertible by means of a chopstick or other implement capable of kneading the jelly into a taffy or slime-like candy. The jelly stock, formed by a flowable composition whose ingredients include gelatin, is poured into an open cup where it proceeds to undergo setting in the course of which gelling takes place. But before the composition is permitted to fully set and while it is still in a partially gelled, sticky state, the cup is sealed by a removable cover to arrest further setting.

When a child wishes to convert the partially set jelly into a taffy or slime-like candy, the child removes the cover from the cup and then kneads the jelly therein with the implement to disrupt its internal structure until it assumes the desired constituency, at which point the child with his fingers can pull the converted jelly out of the cup, stretch it into strands and eat the strands as candy.

BRIEF DESCRIPTION OF DRAWING

For a better understanding of this invention, as well as further features and objects thereof reference is made to the detailed description to be read in conjunction with the annexed drawing wherein:

FIG. 1 is a perspective view of a sealed cup containing a partially-set jelly in accordance with the invention, and a chop stick for kneading this jelly;

FIG. 2 shows the cup with its cover removed and after the partially-set jelly therein has been kneaded, and can now be pulled by a finger out of the cup to form edible candy strands.

DETAILED DESCRIPTION OF INVENTION

To produce a candy having taffy or slime-like characteristics in accordance with the invention, the starting stock is a flowable aqueous composition capable of forming a conventional edible jelly. Such compositions usually includes gelatin, glycerol, corn syrup, sugar and starch, as well as a coloring agent to impart yellow, red or another color to the jelly. When this composition in its liquid state is held in an open container or mold, and is permitted to fully set, in the course of which volatile components evaporate from the composition, the resultant jelly which takes the form of the container or mold, is semi-solid, resilient and free of stickiness.

As indicated in the McGraw-Hill Chemical and Process Technology Encyclopedia, a gel or jelly "has a three-dimensional network kept together by junction points." These junction points are formed by "primary valence bonds, attractive forces of long range or secondary valence bonds which maintain an association between parts of polymeric chains or form microscopic crystalline regions." Hence the integrity of a jelly body depends on this three-dimensional network which effectively acts as the structural skeleton of the jelly.

To produce a jelly candy having slime-like characteristics in accordance with the invention, a flowable jelly composition 10 is poured into an open cup container 11 which is molded of synthetic plastic such as polyethylene or other liquid and vapor-impermeable material. This jelly composition then proceeds to set in the course of which its volatile components evaporate. The time period necessary to bring about complete setting of the jelly depends on the nature of the composition.

When composition 10 is in a partially-set state and gelation has not been fully consummated, container 10 is hermetically sealed by a removable cover 12, preferably of the same material. This closure of the container or cup prevents evaporation from the composition and arrests further setting thereof.

Thus the composition held within the container is stored therein in a partially-set state. When a user wishes to produce a candy having the desired characteristics, he removes the cover 12 to expose the composition, and then with a chop stick 13 or similar implement, proceeds to beat and knead the composition vigorously. This action ruptures the three-dimensional internal network which maintains the integrity of the partially-set jelly, so that its constituancy then takes on taffy or slime-like characteristics.

Then the user, with his fingers, grasps the exposed surface of the sticky candy and pulls it out of the container and stretches it to create, as shown in FIG. 2, a slime-like strand or strands 15 of any desired length, for the strands, as they are extended from the cup, grow thinner, but do not break. These strands are edible candy and may, therefore, be eaten.

Because the candy composition is sticky and is manipulated by the fingers of the user, the process involved in eating this candy is messy and primitive.

While this has been shown a preferred embodiment of the invention, it is to be understood that many changes may be made therein within the spirit of the invention.

I claim:

1. A convertible jelly candy cup and stick assembly comprising:
   A. a cup having a removable cover to hermetically seal the cup;
   B. a composition stored in the cup formed by a partially-set edible jelly whose full setting is arrested by the cover which is applied to the cup, when the jelly is in a partially-set state, whereby when the cover is later removed, the composition is then exposed; and
   C. an implement for manually kneading the exposed composition to cause it to assume sticky, taffy-like characteristics whereby the composition can then be pulled out of the cup by fingers of a user and stretched to create an edible strand of candy.

2. An assembly as set forth in claim 1, in which the cup and cover therefor are formed of a synthetic plastic material which is impermeable to liquid and to vapors emanating from the liquid.

3. An assembly as set forth in claim 2, in which the material is polyethylene.

4. An assembly as set forth in claim 1, in which the implement is a chop stick.

5. An assembly as set forth in claim 1, in which the composition includes gelatin.

6. An assembly as set forth in claim 5, in which the composition includes sugar.

7. An assembly as set forth in claim 6, in which the composition includes a coloring agent.

* * * * *